United States Patent [19]

Bolmstedt et al.

[11] Patent Number: 4,700,770
[45] Date of Patent: Oct. 20, 1987

[54] INLET DEVICE IN PLATE EVAPORATOR

[75] Inventors: Ulf Bolmstedt, Staffanstorp; Björn-Olow Johansson, Lomma, both of Sweden

[73] Assignee: Alfa-Laval Food & Dairy Engineering AB, Lund, Sweden

[21] Appl. No.: 774,943

[22] Filed: Sep. 11, 1985

[30] Foreign Application Priority Data

Oct. 10, 1984 [SE] Sweden ............................. 8405056

[51] Int. Cl.⁴ ............................................. F28F 27/02
[52] U.S. Cl. ....................................... 165/1; 165/101; 165/166
[58] Field of Search ................ 165/101, 167, 153, 166

[56] References Cited

U.S. PATENT DOCUMENTS

| 403,936 | 5/1889 | Halsey | 165/101 |
|---|---|---|---|
| 1,580,504 | 4/1926 | Lava | 165/101 |
| 3,150,028 | 9/1964 | Klennerberg | 165/167 X |
| 3,605,882 | 9/1971 | Smith et al. | 165/153 X |
| 3,976,128 | 8/1976 | Patel et al. | 165/153 |
| 4,162,703 | 7/1979 | Bosaeus | 165/167 |
| 4,272,373 | 6/1981 | Stenberg et al. | 165/101 X |
| 4,274,477 | 6/1981 | Nicolic | 165/101 |

Primary Examiner—Albert W. Davis, Jr.
Assistant Examiner—Richard R. Cole
Attorney, Agent, or Firm—Cyrus S. Hapgood

[57] ABSTRACT

In a plate evaporator, a tube (8) is removably inserted through aligned openings in the heat exchange plates (3). The interior of the tube (8) communicates with an inlet (4) for evaporation liquid, situated at one side of the plate package, and also communicates with every second plate interspace by way of distribution holes (10) in the tube wall. The tube may contain a piston (15-16) movable to adjust the capacity of the evaporator.

9 Claims, 1 Drawing Figure

U.S. Patent  Oct. 20, 1987  4,700,770
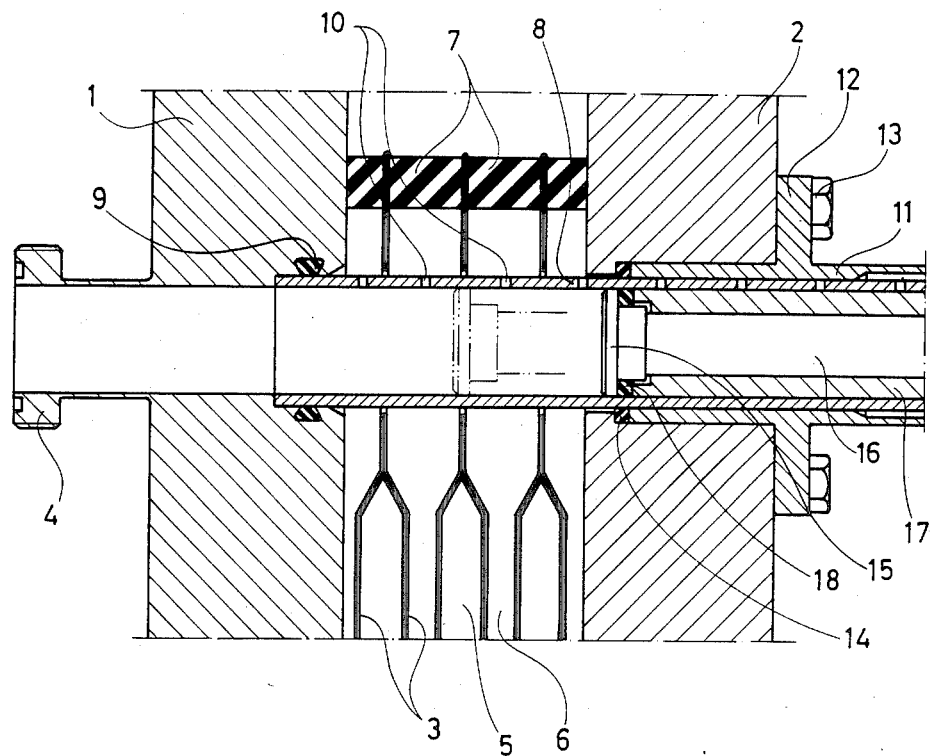

INLET DEVICE IN PLATE EVAPORATOR

The present invention relates to an improvement in evaporators comprising a package of heat exchange plates having through-flow openings aligned with each other and forming an inlet passage through the plate package for a liquid to be evaporated while flowing downwards through every second plate interspace, inlet means being provided at one side of the plate package for supplying said liquid to the inlet passage, which communicates with said plate interspaces through small distribution holes. More particularly, the invention relates to an inlet device in the plate evaporator and to a method of using the device.

In an evaporator of this kind, the small distribution holes between the inlet passage and the plate interspaces generally are formed in gaskets or similar members, which are clamped between the plates and extend around the inlet passage. To enable assembling of the plate evaporator, each of these members must be attached to one of the two plates between which it should seal.

An arrangement of this known kind has the essential drawback that the whole plate package of the evaporator must be disassembled for inspection of the inlet passage or when said holes are to be cleaned after having been clogged. Another drawback, involving a great cost, is the need of attaching a number of said gaskets or other members to the separate heat exchanging plates.

The principal object of the present invention is to provide an inlet device in an evaporator of the initially described kind, which has a simple design and enables inspection, cleaning and, when necessary, a size change of the distribution holes which connect the inlet passage of the evaporator with the different plate interspaces, without disassembling the plate package.

This object is achieved by means of a tube which is removably inserted into the plate package through the openings of the plates, and the interior of which forms said inlet passage, the tube being provided with a number of holes constituting said distribution holes.

In the use of an inlet device of this kind, the peforated tube may be removed from the plate package without the latter having to be disassembled, so that any required measure may be taken concerning the distribution holes. For example, a new tube with a different size of the holes may be inserted into the package. Alternatively, nozzles with a desired opening size may be mounted in the holes. A change in the size of the distribution holes may be desired, for example, upon a change from one evaporation liquid to another, or in connection with cleaning of the plate evaporator.

According to a preferred embodiment of the invention, the perforated tube is inserted into the plate package from the side thereof which is remote from the inlet means. In this way, it is possible to remove the perforated tube without disconnecting the inlet means on one side of the plate package from the inlet conduit for supplying the liquid to be evaporated.

Advantageously, the perforated tube has such a length and such a number of holes that it can be used in plate packages of different sizes. During operation, the part of the interior of the tube which forms an inlet passage in the plate package is separated from the other part of the tube interior by means of a piston, which is inserted into the tube from said side of the plate package which is remote from the inlet means.

According to a further development of the invention, the above-mentioned piston may also be used for closing some of the evaporation interspaces of the plate package from communication with the inlet means. In other words, the capacity of the plate evaporator may be changed in a simple manner without disassembling the plate package. Such a change in the capacity of the plate evaporator may be performed automatically by axial displacement of the piston by means controlled in response to signals produced by a sensing member of some kind.

The invention will be described in more detail below with reference to the accompanying drawing, which is a sectional view through the upper part of a plate evaporator provided with an inlet device according to the invention.

The drawing shows the upper parts of two frame plates 1 and 2, between which there are held together a number of heat exchange plates 3. The frame plates as well as the heat exchange plates are shown with through-flow holes aligned with each other. The frame plate 1, opposite its through-flow hole, is provided with an inlet means 4 for supplying liquid to be evaporated.

The heat exchange plates 3 are united in pairs, as by welding around their above-mentioned holes. Between the united plates of each pair there is formed an interspace 5 for through-flow of a heating medium, such as steam. (The inlets and outlets of the interspaces 5 for the heating medium are not shown in the drawing.)

Between adjacent pairs of united plates 3 there are formed interspaces 6 for flow of the liquid to be evaporated.

The plates of each said pair, being united around said holes, are also united at the top along the edges of the plates, as can be seen from the drawing. Along the same edges, gaskets 7 are provided to seal between adjacent pairs of such united plates.

Into and through the hole in frame plate 2 there extends a tube 8. This tube also extends through the holes in all of the heat exchange plates 3 and ends in the frame plate 1, against which the tubes outer surface seals via an annular gasket 9. The tube 8 has several holes 10, some of which are situated opposite the plate interspaces 6 for liquid to be evaporated. The holes 10 in tube 8 thus form inlets to the plate interspaces 6, which are to receive evaporation liquid. The outlets from the plate interspaces 6 may be of a conventional kind and are not shown in the drawing.

The perforated tube 8 is surrounded by a sleeve 11 having a flange 12 connected with the frame plate 2 by means of screws 13. Between one end of sleeve 11 and a shoulder in the frame plate 2 there is provided an annular gasket 14, which is adapted upon axial compression to expand radially to sealing engagement between frame plate 2 and tube 8.

Within the tube 8 is a piston 15, which is inserted from the end of tube 8 not shown in the drawing. The piston 15 is connected with a piston-rod 16, which is surrounded by a sleeve 17 within the tube 8. Between piston 15 and one end of the sleeve 17 there is an annular gasket 18, which is adapted upon axial compression to expand radially to sealing engagement between the piston-rod 16 and tube 8.

By broken lines, the piston 15 is shown in an alternative position in tube 8. The piston can be adjusted to close a desired number of passages 6 from communication with the part of the interior of the tube 8 which communicates with inlet means 4 for supplying liquid to be evaporated, thereby adjusting the capacity of the evaporator.

A plate evaporator may be provided with any desired number of inlet devices of the kind described above. For instance, a plate evaporator may have two or three inlets coupled in parallel and situated on the same level at the upper part of the plate package.

In the drawing, the distribution holes 10 of the tube 8 are shown directed upwards. Such an arrangement is preferably chosen for achieving the best possible distribution of the evaporation liquid in the plate interspaces 6 in the uppermost part of the plate package. If specially designed nozzles are inserted into the holes 10, a required distribution of the evaporating liquid may be achieved even if the holes are directed downwards.

It will be apparent that screws 13 are loosened to facilitate withdrawal of tube 8 from plates 1–3 for cleaning or replacement. The distribution holes 10 located outside the space between frame plates 1 and 2 in the drawing are located in a portion of tube 8 forming an extension of the inlet passage and therefore are available for use when increasing the number of heat exchange plates 3.

We claim:

1. In combination with a plate evaporator including a package of heat exchange plates defining plate interspaces for separate flows of a liquid to be evaporated and a medium for heating said liquid, every second one of said interspaces being adapted for downward flow of said liquid while being heated by said medium flowing in an adjacent interspace, said plates having openings therethrough aligned with each other to form a row of openings in the upper portion of the plate package, and duct means located at the upper part of the plate package for supplying said liquid and leading to said package from one side thereof, an inlet device comprising a tube extending through said row of openings from the opposite side of said package and movable axially from said duct means and from said plate package by way of said opposite side, said tube forming an extension of said duct means for conducting liquid therefrom and having holes positioned for distribution of liquid from said extension to the upper portion of every second one of said interspaces.

2. The combination of claim 1, comprising also a piston inserted into the tube from said opposite side of the plate package and adjustable axially in the tube to close said duct means from communication with one or more of said distribution holes.

3. The combination of claim 2, in which the tube has a portion projecting from said interspaces through said opposite side of the plate package, said portion forming a further extension of said duct means and having at least one hole for distributing liquid from said further extension, said piston separating said further extension from said duct means.

4. In combination with a plate evaporator including a package of heat exchange plates defining plate interspaces for separate flows of a liquid to be evaporated and a medium for heating said liquid, every second one of said interspaces being adapted for downward flow of said liquid while being heated by said medium flowing in an adjacent interspace, said plates having openings therethrough aligned with each other to form a row of openings in the upper portion of the plate package, and duct means located at the upper part of the plate package for supplying said liquid and leading to said package from one side thereof, an inlet device comprising a tube having holes adapted for distribution of liquid from the tube, and means at the opposite side of the plate package for mounting said tube in position to extend through said row of openings from said opposite side while forming an extension of said duct means and while said holes are located to distribute liquid to the upper portion of every second one of said interspaces, said mounting being operable to allow withdrawal of the tube axially from said package in a direction away from said duct means.

5. The combination of claim 4, comprising also a piston adjustable axially in the tube to close at least one of said distribution holes from said duct means, said piston extending into the tube from said opposite side of the plate package.

6. The combination of claim 5, in which a portion of the tube projects through said opposite side of the plate package and forms a further extension of said duct means having a hole for distributing said liquid, said piston separating said further extension from said duct means.

7. In the operation of a plate evaporator comprising a package of heat exchange plates defining plates interspaces, alternate interspaces being for a liquid to be evaporated by a heating medium flowing through others of said interspaces, said plates having openings therethrough aligned with each other to form a row of openings in the plate package, and inlet means at one side of the plate for supplying said liquid, the method which comprises inserting a tube through said row of openings from the side of the plate package opposite said one side, feeding said liquid from said inlet means to the upper portions of at least some of said alternate interspaces by way of holes in said tube, and withdrawing the tube from the plate package from said opposite side thereof.

8. The method of claim 7, comprising also inserting a piston into said tube, and changing the capacity of the evaporator by adjusting the piston axially in the tube to close or open communication between said inlet means and one or more of said distribution holes.

9. The method of claim 8, in which the piston is inserted into said tube from said opposite side of the package.

* * * * *

UNITED STATES PATENT AND TRADEMARK OFFICE
CERTIFICATE OF CORRECTION

PATENT NO. : 4,700,770

DATED : October 20, 1987

INVENTOR(S) : Ulf Bolmstedt et al.

It is certified that error appears in the above-identified patent and that said Letters Patent is hereby corrected as shown below:

Claim 4, column 4, lines 19-20, after "mounting" insert--means--.

Claim 7, column 4, line 41, after "plate" insert--package--.

Signed and Sealed this

Ninth Day of August, 1988

Attest:

DONALD J. QUIGG

*Attesting Officer*  *Commissioner of Patents and Trademarks*